Nov. 18, 1924.
H. F. FRENCH
1,515,945
COATED DRY CELL AND PROCESS OF MAKING THE SAME
Filed June 30, 1919
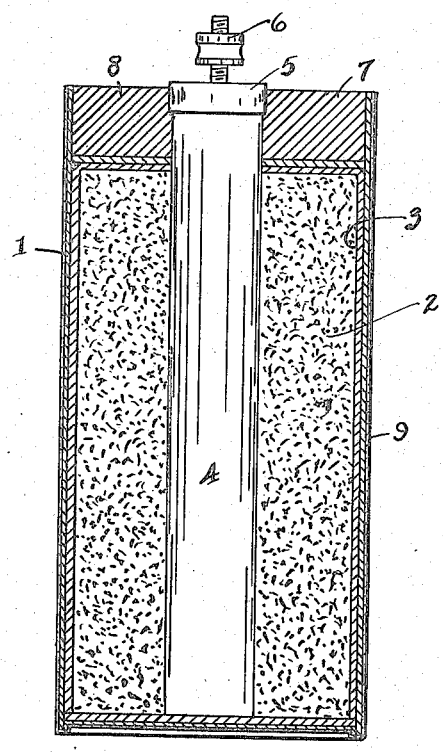
INVENTOR
H. F. FRENCH
BY
H. G. Grover
ATTORNEY Patented Nov. 18, 1924.

1,515,945

UNITED STATES PATENT OFFICE.

HARRY F. FRENCH, OF FREMONT, OHIO, ASSIGNOR TO NATIONAL CARBON COMPANY, INC., A CORPORATION OF NEW YORK.

COATED DRY CELL AND PROCESS OF MAKING THE SAME.

Application filed June 30, 1919. Serial No. 307,574.

*To all whom it may concern:*

Be it known that I, HARRY F. FRENCH, a citizen of the United States, residing at Fremont, in the county of Sandusky and State of Ohio, have invented a certain new and useful Improvement in Coated Dry Cells and Processes of Making the Same, of which the following is a full, clear, and exact description.

My invention relates to dry cells and more particularly to the provision of a tough adherent external coating of celluloid or equivalent nitro-cellulosic material for the zinc electrode, to prevent leakage when the electrolyte has eaten therethrough.

As is well known, dry cells have a zinc can to contain the battery contents, and also to act as the positive electrode. It is also well known that the zinc, due to a variety of causes, does not dissolve away uniformly throughout its whole surface, but corrodes or dissolves irregularly, so that it sooner or later becomes eaten through at a number of points, which permits the leaking of the electrolyte, the admission of air and the consequent shortening of the life of the cell.

Dry cells are usually surrounded by a paper jacket and when the zinc can is eaten through, this jacket becomes wet with the electrolyte, and if the cells are connected in series they are liable to become short circuited by the moist jackets.

It has been proposed to paint the zinc can with varnish, shellac, paraffine and various paints, to prevent the leaking of the electrolyte through the corroded parts; but while these somewhat serve the purpose, they can by no means be relied on to overcome the difficulty, as all such coatings are necessarily of such a character that they cannot stand much of a strain. Consequently it is only a question of time until the electrolyte breaks through the paint. varnish or other coating, to wet the jacket and deplete the cell of electrolyte.

The object of my invention is to apply a particular character of coating possessing such characteristics that the leakage through the corroded parts of the zinc will be entirely eliminated. The manner in which this is accomplished will be explained in the appended description, and illustrated in the annexed drawing in which the single figure is a representation of a typical form of dry cell containing the improvement.

In the drawing the zinc can 1 contains a mix 2 consisting of the usual materials, and between the two is placed a porous or bibulous lining 3 which may be paper, cloth or any other material that would serve the purpose. The carbon electrode 4 bearing a cap 5, and binding post 6, is located in the center of the cell with the mix packed tightly therearound. The upper part of the cell is closed by a pitch, wax or analogous seal 7 which may be poured in a molten condition on top of a disk 8 of cardboard or other appropriate material.

The parts just described are old and well known in the art, and my improvement consists in coating the zinc can with a tough adherent material 9 of a nitro-cellolosic material having the essential characteristics of celluloid that can be placed thereon in a liquid condition and which will dry or change over into a very strong adherent waterproof coating which will retain the electrolyte when the sheet zinc is corroded through.

To apply the coating to the zinc, a suitable celluloid solution is formed by thinning the material known to the trade as "celluloid lacquer" with a suitable solvent, preferably amyl acetate, and the same is applied to the clean zinc can by painting, dipping, spraying, etc., in a sufficient amount to form the coating thereon. This coating will readily dry by evaporation of the solvent and the celluloid will be found to stick very tenaciously to the zinc. The coating adheres so tenaciously that it can be removed only by inserting a thin knife blade or other instrument between it and the zinc. Consequently, when this coat has once been applied it will not become separated from the zinc in practice, and cells having such a coating therefore will not leak electrolyte.

I have found that even a very thin celluloid coat is strong enough to resist breaking or splitting when the zinc is corroded through. My novel coating is therefore a decided improvement over prior types which become useless as soon as the zinc is dissolved away.

There are special advantages in employing a tough adherent coating of transparent material, such as celluloid. For instance, the celluloid coating can be made to serve the purpose of the paper jacket and it would be impossible for unscrupulous dealers to palm off old or defective dry cells on purchasers, as the corroded spots due to shelf life or faulty construction could be plainly seen through the transparent coating. It will be understood, nevertheless, that a dry cell that has become corroded through at a number of places still has a great deal of life and need not be thrown away. But when the cell is purchased from a dealer it is supposed to be in perfect condition, and the customer naturally would not want the cell if it were evident that part of its energy had been wasted away on account of local action or other causes.

Having described my invention, what I claim is:—

1. In a dry cell, a zinc container electrode, and a layer of nitrocellulosic material directly adherent to the exterior surface of the sides and bottom of the container electrode.

2. Process of coating a dry cell container, comprising applying a solution of nitrocellulosic material directly to the sides and bottom of the container.

In testimony whereof, I hereunto affix my signature.

HARRY F. FRENCH.